Oct. 10, 1950 L. L. TROUTMAN 2,525,384
TRUCK LOADER
Filed Jan. 17, 1949 3 Sheets-Sheet 2

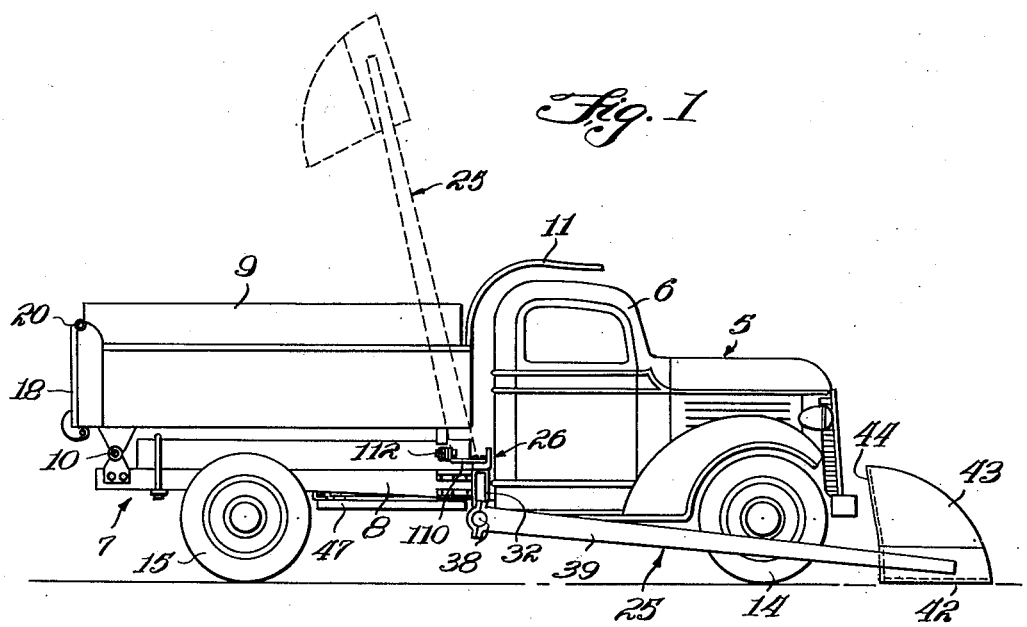

INVENTOR.
Lester L. Troutman,
BY Victor J. Evans & Co.
ATTORNEYS

Oct. 10, 1950     L. L. TROUTMAN     2,525,384
TRUCK LOADER
Filed Jan. 17, 1949     3 Sheets-Sheet 3
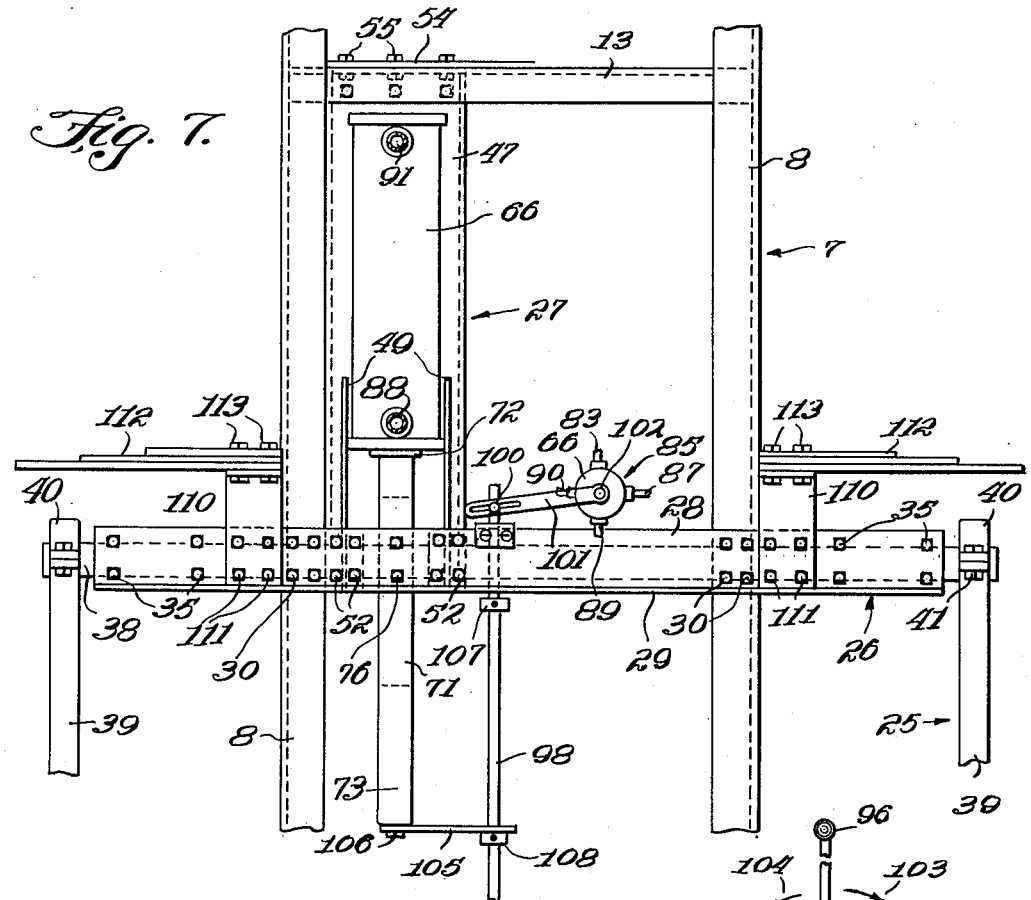
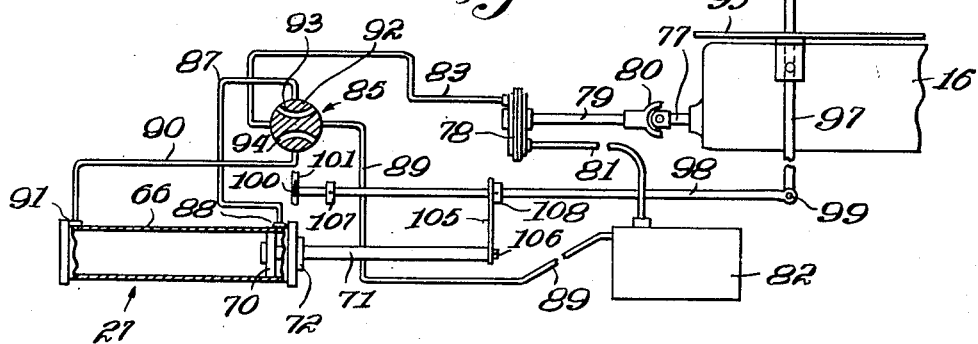
INVENTOR.
Lester L. Troutman,
BY Victor J. Evans & Co.
ATTORNEYS Patented Oct. 10, 1950

2,525,384

UNITED STATES PATENT OFFICE 2,525,384

TRUCK LOADER

Lester L. Troutman, El Monte, Calif.

Application January 17, 1949, Serial No. 71,270

5 Claims. (Cl. 214—78)

The present invention relates to self-loading vehicles, and in particular to a motor vehicle having a vertically swinging shovel or scoop which is positioned forwardly of the vehicle during loading and moved vertically and rearwardly during unloading.

One object of the invention is to provide a self-loading device for conventional trucks and other motor vehicles having a hopper type body, which device is adapted to be conveniently and easily installed without necessitating structural changes in the vehicle or body parts.

Another object is to provide a self-loading device for hopper trucks which is supported on the chassis frame of the truck and is easily attached thereto by merely drilling bolt openings in the frame members of said chassis.

Another object is to provide a self-loading device for hopper type vehicle trucks which includes a vertical swinging shovel or scoop controlled by pressure fluid motor means having a manual control within easy reach of the operator of the truck or vehicle.

Another object is to provide a shovel or scoop attachment for conventional motor vehicles which is constructed such as to enable the device to be quickly attached to the vehicle and to provide a unitary supporting structure for the rock shaft of the self-loading attachment having a bracket and supporting base for the pressure fluid motor means.

Another object is to provide a self-loading attachment for motor vehicles having a scoop or bucket, the rear wall of which is shaped to facilitate dumping of the load when the shovel, scoop or bucket is in its elevated position.

Another object is to provide a self-loading vehicle having a vertically swinging load support such as a shovel, scoop or bucket with buffer means arranged such as to limit the rearward swinging movement when traveling through the loading portion of its stroke, and thereby displace the load without requiring gates or doors on the bucket, scoop or shovel in order to dump the same.

Another object is to provide a self-loading attachment for motor vehicle trucks having dump bodies of the hopper type which can be sold or distributed in a knocked-down condition and conveniently installed by the purchaser without the aid of expensive machine tools or other implements.

Another object is to provide a self-loading attachment for vehicles having a support which is drilled at spaced apart locations to form openings to be used as a guide or template when drilling the holes through the chassis frame of the vehicle for receiving the attaching bolts. The drilled openings in the support being spaced apart a distance equal to the spacing of conventional chassis frames.

In the drawings:

Figure 1 is a side elevational view of a motor vehicle truck showing the self-loading device attached thereto and illustrating the manner in which the shovel, scoop or bucket is swung vertically from its scooping position forwardly of the vehicle to its dumping position over the hopper of the truck.

Figure 2 is a top elevational view of the motor vehicle truck showing a portion of the hopper body broken away and illustrating in plan view the supporting structure for the shovel, scoop or bucket.

Figure 7 is a fragmentary top elevational view of the supporting structure for the shovel arm rock shaft and the pressure fluid operating means therefor.

Figure 3:
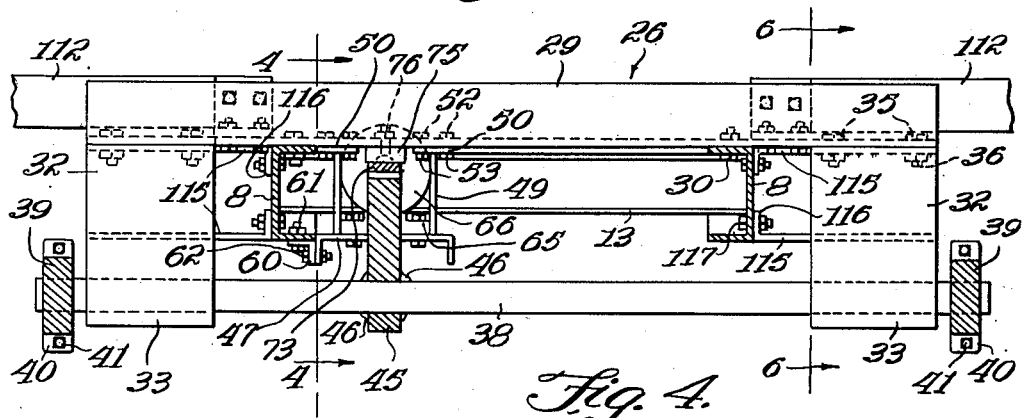
Figure 3 is a vertical transverse cross sectional view taken on line 3—3 of Figure 2 and looking in the direction of the arrows to illustrate the manner in which the supporting bracket and incident parts are bolted to the vehicle chassis.
Figure 4:
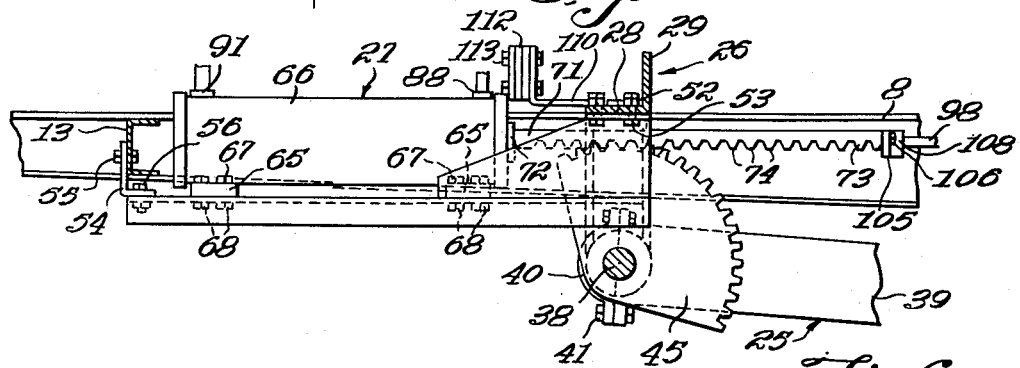
Figure 4 is a vertical cross sectional view taken on line 4—4 of Figure 3 and looking in the direction of the arrows to illustrate the pressure fluid operating means and the supporting bracket therefor.
Figure 5:
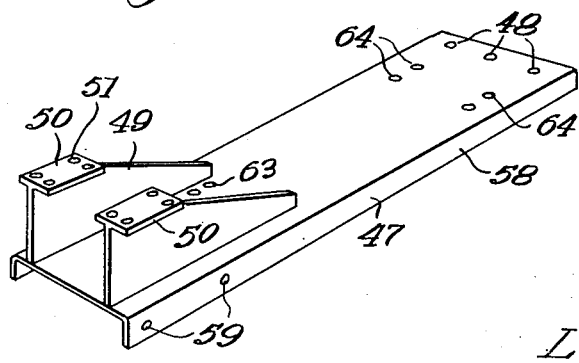
Figure 5 is a perspective view of the supporting bracket for the pressure fluid motor means showing the manner in which the same is drilled and provided with brackets at one end for attachment to the supporting bar extending transversely of the chassis.

Figure 8 is a diagrammatic view of the pressure fluid system, showing the manual control therefor, as well as an automatic control or reversing mechanism for the control valve, and Figure 9 is a diagrammatic view of the control valve, showing the manner in which pressure fluid is admitted to the right hand end of the cylinder to swing the shovel, scoop or bucket to its dumping position, and also showing the manner in which the opposite side of the cylinder is vented for conducting the pressure fluid through the return pipe to the storage tank, or reservoir.

In the drawings, and more in detail, there is shown for the purpose of convenience of illustration, a conventional motor vehicle 5 having a cab 6, and said vehicle includes a chassis generally designated 7 having chassis frame members 8 to which is pivotally attached a hopper type body 9 as at 10. Formed on the hopper type body 9 is a curved projection 11 which is adapted to extend over the roof of the cab 6 and protect the same from falling dirt or debris during the loading and unloading operation of the truck.

Generally, the chassis side frame bars 8 are connected at their rear end by a transverse frame bar 12, and in addition the side frame bars 8 are generally connected by two or more transverse frame bars, one of which is shown as at 13 (Fig. 2).

The usual motor is provided for driving the truck 5, and the truck is supported on the usual steering wheels 14 at the front thereof, and on the traction wheels 15 at the rear. The rear wheels 15 are driven from the motor of the vehicle (not shown), which is drivingly connected to the transmission 16 (Fig. 8) having a drive or torque shaft 17 (Fig. 2). Separate pressure fluid motor means is provided for hoisting the hopper type body 9 to its dumping position, and a tail gate 18 is mounted on the rear portion of the hopper body 9 to swing from a hinge point 20 in the usual manner to facilitate dumping and unloading of the vehicle.

The invention comprises a vertically swinging shovel or load support generally designated 25 supported by a bracket bar generally designated 26, and operated by a pressure fluid motor likewise generally designated 27.

The bracket bar 26 is constructed of an angle iron having horizontal and vertical flanges 28 and 29, and is adapted to be fastened to the chassis side frame bars 8 to extend transversely thereof in the rear of the cab 6. The flange 28 is provided with spaced apart sets of bolt receiving openings adapted to correspond in position to the spacing of the chassis side frame bars 8 so that the supporting bar 26 can be placed over the chassis and form a template while drilling the holes in the upper flange of the side frame bars 8. After the holes are thus drilled fastening bolts 30 are passed through the correspondingly positioned openings, and retaining nuts are threaded on the bolts to securely anchor the angle bar 26 in place.

Figure 6:
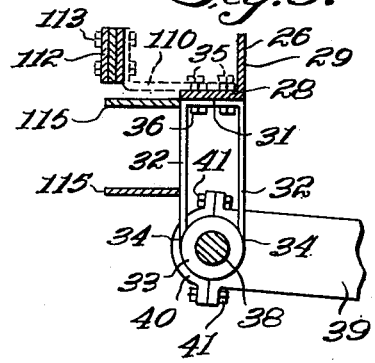
Figure 6 is a vertical cross sectional view taken on line 6—6 of Figure 3 and looking in the direction of the arrows to illustrate one of the rock shaft supporting bearings, and the manner in which the buffers are attached to the transverse supporting member.

In addition to the openings above described, sets of bolt receiving openings are formed adjacent each end of the angle bar 26 and correspond in position to openings formed in a bearing bracket 31, which is provided with depending arms 32 which are welded at their lower ends to a bearing 33. The arms 32 being welded at the points 34 indicated in Figure 6. The bearing brackets 31 are positioned one at each end of the angle bar 26, and fastening bolts 35 are passed through the correspondingly positioned openings in the flange 28 and bracket 31 and are held in place by nuts 36 (Fig. 6).

The bearings 33 support a rotatable shaft 38 which projects a slight distance beyond each side of the cab 6, and to which is attached the arms 39 of the vertically swinging load carrier 25. The shaft 38 is provided with a key-way for receiving a key (not shown), and retaining caps 40 are bolted to the side arms 39 as at 41 to rigidly connect the arms to each end of the shaft 38. The free swinging ends of the arms 39 are connected by a shovel or load carrier having a bottom wall 42, and inwardly directed side walls 43 connected at the rear by a rearwardly slooping wall 44. The bottom wall 42 is adapted to rest upon the surface when the arms are in the position shown in Fig. 1, and the rear wall 44 is adapted to sloop downwardly when the load support is elevated as shown in dotted lines, Figure 1.

Affixed to the shaft 38 is a sector gear 45 which is secured in place by welding at the points 46, and said gear is located slightly to one side of the longitudinal center of said shaft 38 to be positioned in alignment with the pressure fluid motor 27. The pressure fluid motor 27 is mounted on a platform 47 having a series of openings 48 at one end and a pair of spaced apart brackets 49 at the opposite end. The brackets 49 are provided with T-shaped head portions 50 having openings 51 which are adapted to correspond in position to openings formed in the flange 28 of the angle bar 26 so that fastening bolts 52 may be passed through the openings in the flange 28 and through the openings 51, so as to be held in place by nuts 53. Thus, the platform 47 has its front end suspended from the angle bar 26 and its rear end is adapted to be fastened to the transverse chassis frame bar 13 by means of an angle bracket 54 which is held in place by threaded fastening elements 55, and similar fastening elements 56 which are passed through the openings in the angle bar 54 corresponding in position to the openings 48 in the platform 47. The marginal edges of the platform are flanged as at 58, and said flanges are provided with openings 59 along one side for being bolted to the side frame chassis bar 8 by means of an angle bracket 60 held in place by suitable threaded fastening elements 61 and 62.

In addition, the platform 47 is provided with sets of openings 63 and 64 which correspond in position to bolt receiving openings in lugs 65 formed on the base of the motor cylinder 66. Threaded fasteners such as bolts 67 are passed through said openings and are held in place by retaining nuts 68.

Reciprocably mounted in the cylinder 66 is a piston 70 having a plunger rod 71 which projects through a packing gland 72 and is provided with a rack portion 73. The rack portion is provided with rack teeth 74 which are in driving contact with similar teeth on the periphery of the sector gear 45. The rack portion 73 of the plunger 71 extends beneath the flange 28 of the angle bar 29, and a wear plate 75 (Fig. 3) is secured to the underside of said flange by means of retaining bolts 76 held in place by correspondingly threaded nuts. Thus, the wear plate 75 engages the upper surface of the rack bar 73 and maintains facial contact between the rack teeth 74 and the teeth on the gear 45 during the to and fro movement of the rack bar 73.

Pressure fluid is admitted to opposite ends of the motor 27 under the control of a manual lever located adjacent the driver's seat, and as illustrated in Figure 8, the vehicle transmission 16 is provided with a power take-off shaft 77 which is drivingly connected to a pump 78 by means of a shaft 79 and universal connection 80. The pump 78 may be fastened to a convenient portion of the chassis frame or vehicle, and is provided with an inlet pipe 81, which is connected to a source of liquid supply such as a reservoir tank 82. An outlet pipe 83 is connected to the pump and extends to a four-way control valve generally designated 85 which includes a casing 86, Fig. 7 to which the pipe 83 is connected. Also secured to the casing 86 at right angles to the pipe 83 is a pipe line 87 which is attached to one end of the cylinder 66 as at 88. Directly opposite the pipe 83 is a pipe 89 which is connected to the casing 86 of the valve, and has its opposite end connected to the reservoir tank 82.

The remaining pipe 90 is connected to the valve casing 86 directly opposite to the pipe 87, and said pipe 90 has its other end connected to the opposite end of the cylinder 66 as at 91: The valve casing 86 is provided with a rotary plug 92 having arcuate ports 93 and 94 adapted to alternately communicate the pipes 83—87 and 89—90 with the pipes 83—90 and 87—89. Thus, by moving the valve plug 92 to the position shown in Figure 9, pressure fluid may be admitted through the pipe 83, valve port 93 and thence to the right hand end of the cylinder 66 through the pipe 87. In this valve position the piston 70 will be moved to the left to raise the load support 43 and swing the same vertically from the position shown in Figure 1 to the dotted line position in the same figure. Simultaneously, low pressure fluid in the cylinder 66 will pass back to the reservoir tank 82 through the pipe 90, valve port 94 and return pipe 89. When the valve plug 92 is angularly displaced 45° in a counter-clockwise direction, the supply pipe 83 will then communicate with the pipe 90 through the port 93 to admit pressure fluid to the left hand end of the cylinder 66 to move the piston to the right and swing the load support or shovel 25 downwardly to its starting position. Simultaneously, the pipe 87 is placed in communication with the return pipe 89 through the valve port 94 to allow low pressure fluid to return to the supply tank 82.

In order to control the rotary plug 92, a hand lever 93 is pivotally mounted on a bracket 94 below the floor board 95 so that the handle 96 will be within easy reach of the driver of the vehicle. The lower end of the lever 93 as at 97 is connected to a control rod 98 by means of a pivot pin 99, and the opposite end of the control rod 98 has a pin and slot connection 100 with a valve actuating lever 101. The lever 101 (Figure 7) is connected to the spindle 102 of the rotary valve plug 92 so that movement of the lever 101 will shift the plug as above described, and when the control lever 93 is moved in the direction indicated by the arrow 103 (Fig. 8), the valve plug 92 will be positioned to admit pressure to the left hand end of the cylinder 66 and move the load carrier 25 downwardly. Reversely, when the lever 93 is moved in the direction of the arrow 104 (Fig. 8) the load carrier 25 will be swung vertically under the influence of the piston 70 actuated by pressure fluid being admitted to the right hand end of the cylinder 66.

In order to shift the valve 92 to its neutral position when the load carrier 25 and piston 70 reach the limit of their travel in both directions, an arm 105 is attached to the end of the plunger 71 as at 106, and said arm 105 is engageable with stop collars 107 and 108 on the control rod 98 as shown in Figs. 7 and 8, so that when the piston 70 moves to the limit of its travel to the right the arm 105 will engage the stop 108 and shift the plug 92 to its neutral position, Fig. 8. The reverse occurs when the piston 70 moves to the limit of its travel to the left and the arm 105 engages the stop 107 and shifts the valve plug 92 to its neutral position.

Mounted adjacent the ends of the angle bar 26 is an angle bar 110 arranged one at each side of the chassis 7, and said angle bars are held in place by fastening screws or bolts 111. Bolted to the upstanding portion of the angle bracket 110 is a series of spring leaves 112 which are held in place by threaded fasteners 113. The spring leaves 112 project laterally from the sides of the truck and are arranged in the path of the arms 39 to limit the swinging movement of the load carrier or shovel 25 as illustrated in dotted lines (Figure 1).

In order to additionally brace the angle bar 26 with respect to the chassis frame 7 the depending bearing bracket arms 32 have welded thereto gusset plates 115 (Fig. 6) which have one of their ends shaped to provide an angle portion 116 adapted to be bolted to the side frame members 8 of the chassis by means of bolts 117 (Fig. 3). It will readily be understood that the gussets 115 may be bolted in place after all of the parts are assembled as previously described.

It is to be noted, that the parts of the angle bar supporting structure 26 as well as the supporting structure for the pressure fluid motor 27 are reversible to facilitate positioning of the motor on either side of the vehicle chassis. If, for any reason, should it be desired to place the motor 27 on the other side of the chassis from that shown in Fig. 7, the angle bar 26 may be reversed as well as the shaft 38 so as to position the gear 45 in alignment with the motor. Thus, a universal structure is provided which can be assembled on a wide variety of motor vehicles without changing the structure of the vehicle or altering the arrangement of the parts thereof. It is intended that the attachment be sold in a knocked-down condition so that the truck owner may obtain the same from the dealer and install the entire loading device on a standard motor truck without requiring tedious labor and only necessitating the drilling of a few holes in the side frame members of the chassis 7, as well as the transverse frame member 13. The motor operating mechanism can also be conveniently installed by the use of such tools as screw drivers and wrenches.

I claim:

1. In a self-loading vehicle having a chassis and a hopper body mounted thereon, a transverse supporting bar positioned on top of the side frame members of said chassis and having bolt receiving openings positioned to correspond to the spacing of said side frame members, bearing brackets depending from said supporting bar adjacent the ends thereof, a shaft journaled in said bearing brackets, an arm attached to each end of said shaft, a load support connecting the free swinging ends of said arms and movable from a position in front of said vehicle to a position above said hopper body, gear means on said shaft and disposed between the side frame members of said chassis, a platform, a pair of spaced brackets on said platform at one end thereof having flanged portions provided with bolt receiving openings for receiving fastening bolts which are adapted to pass through corresponding bolt receiving openings in said supporting bar, an angle bracket connected to the opposite end of the platform adapted to be affixed to one of the cross frame members of said chassis, pressure fluid motor means on said platform in driving engagement with said gear means, means for supplying said motor means with a pressure fluid, manually operable means for controlling the flow of pressure fluid to said motor means and means actuated by said motor means to render said last named means neutral when the free swinging ends of said arms have moved to the limit of their upward swinging movement.

2. In a self-loading vehicle, having a chassis and a hopper body mounted thereon, a transverse supporting bar positioned on top of the side frame members of said chassis and having bolt receiving openings positioned to correspond to the spacing of said side frame members, bearing brackets depending from said supporting bar adjacent the ends thereof, a shaft journaled in said bearing brackets, an arm attached to each end of the shaft, a load support connecting the free swinging ends of said arms and movable from a position in front of said vehicle to a position above said hopper body, gear means on said shaft and disposed between the side frame members of said chassis, a platform, a pair of spaced brackets on said platform at one end thereof having flanged portions provided with bolt receiving openings for receiving fastening bolts which are adapted to pass through corresponding bolt receiving openings in said supporting bar, an angle bracket connected to the opposite end of the platform adapted to be affixed to one of the cross frame members of said chassis, pressure fluid motor means on said platform in driving engagement with said gear means and means for supplying said motor means with a pressure fluid, said bolt receiving openings being pre-formed in said supporting bar to form a template for the drilling of the bolt receiving openings in said chassis side frame members.

3. In a self-loading motor vehicle having a chassis with a hopper type body and a power take-off shaft drivingly connected to the motor of said vehicle, a supporting bar mounted on the side frame members of said chassis having bolt receiving openings corresponding in position to the spacing of the side frame members, a shaft supported by said bar and extending transversely of said chassis, a pair of arms arranged one at each end of said shaft, a load support connecting the free swinging ends of said arms adapted to swing vertically from a position in front of said vehicle to a position above said hopper body, pressure fluid motor means for rotating said shaft in both directions of rotation, a platform for supporting said motor means having one end connected to the supporting bar and its opposite end connected to said chassis, and means drivingly connected to said power take-off for alternately supplying pressure fluid to opposite ends of said motor means.

4. In a self-loading motor vehicle having a chassis with a hopper body thereon and a power take-off shaft drivingly connected to the motor of said vehicle, a support extending transversely of said chassis having a series of bolt receiving openings therein, certain of said bolt receiving openings being positioned to correspond in position with bolt receiving openings in said chassis side frame bars, bearing brackets adjacent each end of said supporting bar, a shaft journaled in said brackets, a vertically swinging load support having its arms affixed to said shaft and arranged to swing vertically from a position in front of the vehicle to a position above the hopper body, a platform having spaced brackets at one end adapted to be suspended from the supporting bar, said brackets having bolt receiving openings corresponding to certain other bolt receiving openings in said supporting bar, pressure fluid motor means on said platform drivingly connected to said shaft, a pump drivingly connected to said power take-off shaft for supplying pressure fluid to said motor means, manually operable means for controlling the flow of pressure fluid to said motor means and means actuated by said motor means to render said last named means neutral when said vertically swinging load support has moved to the limit of its upward swinging movement.

5. In a self-loading motor vehicle having a chassis with a hopper body thereon and a power take-off shaft drivingly connected to the motor of said vehicle, a support extending transversely of said chassis having a series of bolt receiving openings therein, certain of said bolt receiving openings being positioned to correspond in position with bolt receiving openings in said chassis side frame bars, bearing brackets adjacent each end of said supporting bar, a shaft journaled in said brackets, a vertically swinging load support having its arms affixed to said shaft and arranged to swing vertically from a position in front of the vehicle to a position above the hopper body, a platform having spaced brackets at one end adapted to be suspended from the supporting bar, said brackets having bolt receiving openings corresponding to certain other bolt receiving openings in said supporting bar, pressure fluid motor means on said platform drivingly connected to said shaft, a pump drivingly connected to said power take-off shaft for supplying pressure fluid to said motor means, manually operable means for controlling the flow of pressure fluid to said motor means and means actuated by said motor means to render said last named means neutral when said vertically swinging load support has moved to the limit of its upward swinging movement, said motor means including a reciprocating piston operably mounted in a cylinder and having a rack and pinion drive connection with said shaft.

LESTER L. TROUTMAN.

REFERENCES CITED

The following references are of record in the file of this patent:

UNITED STATES PATENTS

| Number | Name | Date |
|---|---|---|
| 1,943,614 | McCarron | Jan. 16, 1934 |
| 2,170,932 | Venema | Aug. 29, 1939 |
| 2,441,591 | Owen | May 18, 1948 |
| 2,457,039 | Graves et al. | Dec. 21, 1948 |
| 2,459,473 | Troutman | Jan. 18, 1949 |
| 2,470,778 | Lankovski et al. | May 24, 1949 |